April 21, 1959  J. JARVIS  2,883,126
CONTROL SYSTEM
Filed April 22, 1954
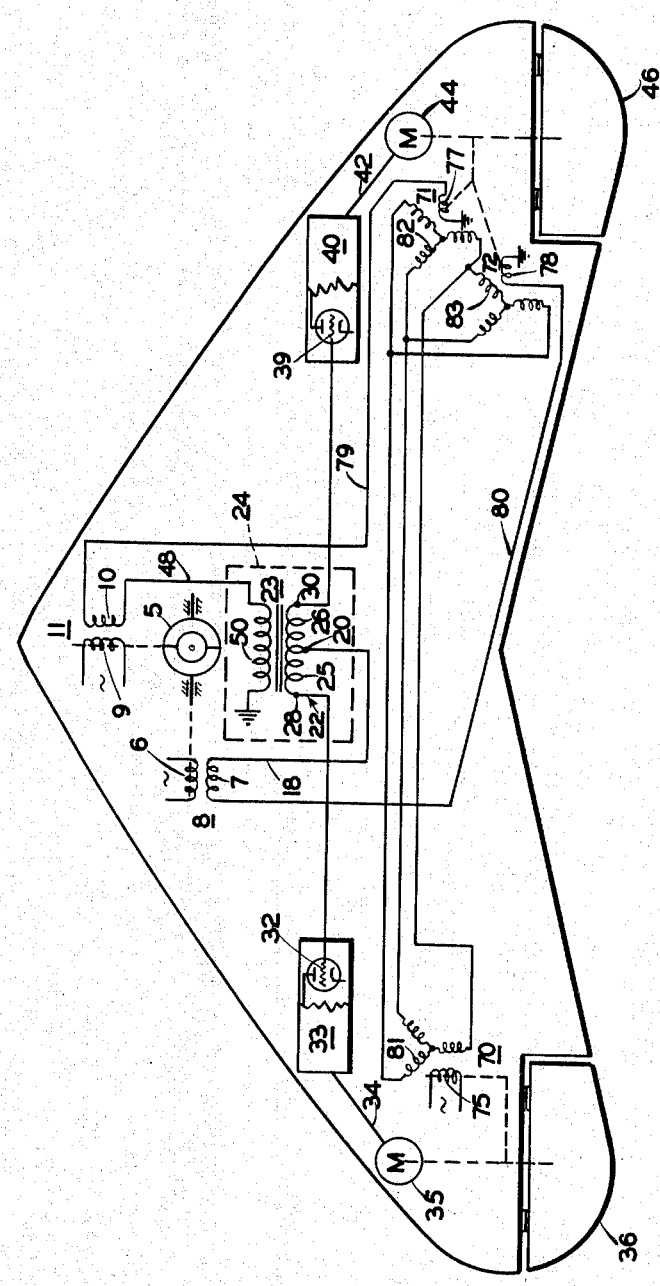
INVENTOR.
JOHN JARVIS
BY
Oscar B Brumback
ATTORNEY United States Patent Office
2,883,126
Patented Apr. 21, 1959

2,883,126
CONTROL SYSTEM

John Jarvis, Dumont, N.J., assignor to Bendix Aviation Corporation, Teterboro, N.J., a corporation of Delaware Application April 22, 1954, Serial No. 424,833

6 Claims. (Cl. 244—77)

This invention relates generally to control systems and more particularly to a control system for aircraft of the type in which the same surfaces control the attitude of the craft about several axes.

In flying wing type aircraft, the same control surfaces are operated to control the craft about both the pitch and roll axes. When the surfaces are operated in the same direction, they control the pitch attitude of the craft; and when they are operated in opposite directions, they control the roll attitude of the craft.

An object of the present invention is to provide a novel arrangement for selectively operating a plurality of surfaces of a craft in the same or opposite directions depending upon their input from a plurality of signal chains.

Another object is to provide a novel follow-up arrangement for servomotors which selectively operate conjointly or oppositely.

A further object is to provide a novel signal mixer arrangement for a control system having a plurality of signal channels, which channels selectively operate a pair of servomotors together or oppositely depending upon the signal channel supplying the control signal.

Still another object is to provide a novel system for selectively operating a plurality of servomotors in the same direction or in opposite directions.

The present invention contemplates an automatic control system having a plurality of servomotors which selectively operate in the same direction in response to commands from one signal chain and in opposite directions in response to commands from another signal chain, the command signals from one signal chain being applied to the primary winding of a transformer and the command signals from another signal chain being applied to the center tap of the secondary winding whose end terminals are connected with actuators so that the latter operate in opposite directions when a signal is applied to the primary winding and in the same direction when a signal is applied to the center tap of the secondary winding, and a follow-up arrangement for developing a signal in opposition to the command signal so that the extent of the operation of the actuators corresponds to the magnitude of the signal applied to them.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for purposes of illustration and description, and is not to be construed as defining the limits of the invention.

The single sheet of the drawing illustrates schematically the novel signal system of the present invention as controlling a flying wing type aircraft.

Referring now to the drawing, a conventional vertical gyroscope 5 responds to the displacements of the aircraft about the pitch and roll axes: displacement from a predetermined pitch attitude relatively displacing the rotor 6 and stator 7 of an inductive device 8 to develop a signal corresponding in phase and in amplitude to the direction and extent of displacement, respectively; and displacement from a predetermined roll attitude relatively displacing rotor 9 and stator 10 of an inductive device 11 to develop a corresponding roll displacement signal.

Considering the control channel for the pitch axis first, the signal from stator 7 is fed by way of lead 18 to the center terminal 20 of the secondary winding 22 of transformer 23 of the novel signal mixing system 24 of the present invention. By way of sections 25 and 26 of secondary winding 22, the signal is applied to end terminals 28 and 30; terminal 28 being connected to the grid 32 of a vacuum tube in a conventional amplifier system 33 whose output by way of lead 34 energizes a servomotor 35 to displace a control surface 36; and terminal 30 being connected to grid 39 of a vacuum tube in a conventional amplifier 40 whose output by way of lead 42 energizes a servomotor 44 to displace a control surface 46. Since the same control signal is applied to servo amplifier 33 and 40, servomotors 35 and 44 displace the control surfaces 36 and 46 in the same direction. This controls the pitch attitude of the craft.

In the roll channel, the signal from stator 10 is applied by way of lead 48 to the primary winding 50 of transformer 23 of the novel signal mixing system 24. Since secondary winding 22 is center tapped, the signal induced in section 25 and appearing at terminal 28 will be opposite in phase to the signal induced in section 26 and appearing at terminal 30. Thus, signals of equal amplitude but of opposite phases will be applied to amplifiers 33 and 40. Accordingly, control surface 36 will be displaced in one direction and control surface 46 will be displaced in the opposite direction. This controls the roll attitude of the craft.

The novel signal mixing system 24 of the present invention has provided for signals from the pitch control channel and the roll control channel to be mixed and applied to servomotors 34 and 44 in such fashion that signals from the pitch control channel cause the servomotors to be operated in the same direction and signal from the roll control channel causes these servomotors to be operated in opposite directions. Novel means is also provided to develop a follow signal so as to control the extent of surface displacement by the servomotors.

The follow-up arrangement in accordance with the present invention is comprised of a transmitter inductive device 70 and two receivers inductive devices 71 and 72. Rotor 75 of inductive device 70 is mechanically connected for displacement by servomotor 35, and rotors 77 and 78 of inductive devices 71 and 72 are mechanically connected for displacement by servomotor 44. Rotor winding 75 is energized; rotor winding 77 is connected by way of lead 79 to stator 10 of roll take-off 11; and rotor winding 78 is connected by way of lead 80 to stator 7 of pitch take-off 8. Stator 81 of inductive device 70 is connected in parallel with stator 82 of inductive device 71 and in parallel opposition with stator 83 of inductive device 72.

In the transmitter-receiver combination, the three different voltages induced in the legs of stator winding 81 cause currents to flow in stator windings 82 and 83 where they set up resultant fields. The angular displacements of these resultant fields correspond to or follow the angular displacement of rotor 75; the field of stator 82, however, being opposite in rotation sense to the field of stator 83. Rotors 77 and 78 are normally in a null position; i.e., with their poles at right angles to the resultant fields of their stators, and no signal is induced in these rotors. However, if the position of either rotor 77 or 78 is shifted or the position of the field is shifted due to a shift in the position of rotor 75, rotor 77 or 78 will not be in a null position and a signal will be developed at the rotor.

From the foregoing, it can be seen that as surfaces 36 and 46 are displaced from a normal position in the same direction by motors 35 and 44 as a result of a pitch displacement signal from inductive device 8, rotor 75 is displaced from its normal position correspondingly; but rotor 77 is displaced the same extent as rotor 75 and so maintains its null position. Rotor 78 is also displaced in the same direction; but since the field of stator 83 rotates oppositely to the field in stator 82, a follow-up signal builds up in inductive device 78. As this signal becomes equal and opposite to the displacement signal from inductive device 8, the net input signal to servo amplifiers 33 and 40 is zero so that the motor stops with the surfaces displaced. As the craft returns to the predetermined pitch attitude, the displacement signal decreases to zero and the follow-up signal prevails to return the surfaces to normal position.

In a similar manner, a roll displacement signal from inductive device 11 causes motors 35 and 44 to move control surfaces 36 and 46 in opposite directions, rotors 75 and 78 are moved oppositely and so maintain a null position. The field of stator 82, however, is moved oppositely from the movement of rotor 77 so a signal builds up at follow-up device 71 until it becomes equal and opposite to the roll displacement signal.

The foregoing has presented a novel control system particularly adapted for the type of aircraft in which the character of the movement of the same control surfaces selectively controls the craft about several axes. With the foregoing novel system, control is provided in the proper direction and proper amount corresponding to the direction of displacement of the craft about its control axes.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

What is claimed is:

1. In an aircraft having a pair of surfaces which when moved in the same direction control the attitude of a craft about one axis and which when moved in opposite directions control the attitude about another axis, a follow-up system comprised of a transmitter inductive device and two receiver inductive devices, each device having a stator and a rotor, a signal developing at the rotor of each of said receivers when the rotors of said transmitter and receiver are not in a null position, the rotor of said transmitter being actuated by one of said surfaces and the rotors of said receivers being actuated by the other of said surfaces, the stators of said receivers being oppositely connected with the stator of said transmitter whereby a signal is developed at one receiver when the surfaces are moved in the same direction and at the other receiver when the surfaces are moved in opposite directions.

2. A follow-up arrangement for a system having two servomotors movable in the same or in opposite directions, comprising a transmitter and two receivers, said transmitter being actuated by one of said motors and said receivers being actuated by the other of said motors, said receivers being oppositely connected with said transmitter, whereby a signal is developed by one receiver when the surfaces are moved in the same direction and at the other receiver when the surfaces are moved in opposite directions.

3. A follow-up for a servo system having a pair of motors movable in the same or opposite directions, comprised of a transmitter and receiver combination wherein said transmitter includes a stator and an energized rotor and said receivers each include a stator and a rotor, said transmitter rotor being movable by one of said motors and said receiver rotors being movable by the other of said motors, said transmitter stator being connected with each receiver stator in opposite fashion, whereby a signal is developed at one receiver when the motors are operated in the same direction and at the other receiver when the motors are operated in opposite directions.

4. In an aircraft having a pair of surfaces which when moved in the same direction control the attitude of craft about one axis and which when moved in opposite directions control the attitude of the craft about another axis, a steering system comprised of reference means for developing a first signal corresponding to the condition of the craft about said one axis, reference means for developing a second signal corresponding to a condition of the craft about said other axis, a servomotor for moving each surface, control means each having an input and an output, means connecting said reference means to said inputs for transmitting said signals, means connecting said outputs to said servomotors, said control means developing an output for driving said servomotors in the same direction in response to said first signal and for driving said servomotors in opposite directions in response to said second signal, a transmitter and two receivers, said transmitter being actuated by one of said servomotors and said receivers being actuated by the other of said servomotors, said receivers being oppositely connected with said transmitter, whereby a follow-up signal is developed at one receiver when the surfaces are moved in the same direction and at the other receiver when the surfaces are moved in the opposite directions, and means for connecting the signal from said one receiver to said control means in opposition to said first signal and for connecting the signal from said other receiver to said control means in opposition to said second control signal.

5. A control system having a pair of servomotors movable in the same or in opposite directions comprising first means for developing a first control signal, second means for developing a second control signal, control means having an input for each signal and an output for each servomotor, said control means developing an output for driving said servomotors in the same direction in response to said first signal and for driving said servomotors in opposite directions in response to said second signal, a transmitter and two receivers, said transmitter being actuated by one of said servomotors and said receivers being actuated by the other of said servomotors, said receivers being oppositely connected with said transmitter, whereby a follow-up signal is developed at one receiver when the surfaces are moved in the same direction and at the other receiver when the surfaces are moved in opposite directions, and means for connecting the signal from said one receiver to said control means in opposition to said first signal and for connecting the signal from said other receiver to said control means in opposition to said second control signal.

6. A control system for an aircraft having a pair of surfaces movable in the same direction to control the craft attitude about a first axis and movable in opposite directions to control the craft attitude about a second axis, comprising a servomotor for moving each surface, inductive devices constituting a transmitter and a pair of receivers and each including a rotor and a stator, said transmitter having its rotor movable by one of said servomotors and said receivers having their rotors movable by the other of said servomotors, said transmitter having its rotor energized and its stator connected in parallel reverse with the stator of each receiver whereby a signal corresponding to the relative displacement of said transmitter and receiver rotors is developed at one receiver when said servomotors are operated in opposite directions and at the other receiver when said servomotors are operated in the same direction, reference means for developing a first signal corresponding to a craft condition about said first axis, reference means for developing a second signal corresponding to a craft condition about said second axis, and control means for said servomotors including a transformer having primary and center tapped secondary windings, said secondary winding having each of its end terminals connected to a respective one of said servomotors, said first reference means and one receiver being connected to said primary winding, whereby a signal applied to said primary winding operates said servomotors to move said surfaces in opposite directions, and said second reference means and other receiver being connected to said center tap whereby a signal applied to said center tap operates said servomotors to move said surfaces in the same direction.

References Cited in the file of this patent

UNITED STATES PATENTS

| | | |
|---|---|---|
| 2,417,821 | Harcum et al. | Mar. 25, 1947 |
| 2,558,096 | Markusen | June 26, 1951 |
| 2,634,925 | Kutzler | Apr. 14, 1953 |
| 2,769,603 | McDonnell | Nov. 6, 1956 |